United States Patent

Tsujimoto et al.

[11] Patent Number: 5,595,946
[45] Date of Patent: Jan. 21, 1997

[54] SUBSTRATE MATERIALS FOR MAGNETIC HEADS WITH LOW FLYING HEIGHT

[75] Inventors: Shinji Tsujimoto, Osaka; Shin Mishima, Takarazuka; Shigeru Kawahara, Kusatsu; Shigeki Mohri, Fukuoka; Toyoshige Sasaki, Fukuoka; Michito Miyahara, Fukuoka; Osamu Nakano, Fukuoka, all of Japan

[73] Assignees: Sumitomo Special Metals Co., Ltd., Osaka; Nippon Tungsten Co., Ltd., Fukuoka, both of Japan

[21] Appl. No.: 434,832

[22] Filed: May 4, 1995

[30] Foreign Application Priority Data

May 14, 1994 [JP] Japan ..................................... 6-124161
Mar. 10, 1995 [JP] Japan ..................................... 7-051622

[51] Int. Cl.$^6$ .............................. C04B 35/56; C04B 35/58
[52] U.S. Cl. ................................. 501/87; 501/96; 501/98
[58] Field of Search .................................. 501/96, 97, 98, 501/87

[56] References Cited

U.S. PATENT DOCUMENTS

| | | | |
|---|---|---|---|
| 4,356,272 | 10/1982 | Kanemitsu et al. | 501/87 |
| 4,582,812 | 4/1986 | Furukawa et al. | 501/87 |
| 5,188,908 | 2/1993 | Nishiyama et al. | 501/98 |
| 5,376,466 | 12/1994 | Koyama et al. | 501/87 |
| 5,476,530 | 12/1995 | Gries et al. | 501/87 |
| 5,520,716 | 5/1996 | Takagi et al. | 501/87 |

*Primary Examiner*—Mark L. Bell
*Assistant Examiner*—Louis M. Troilo
*Attorney, Agent, or Firm*—Jordan and Hamburg

[57] ABSTRACT

Substrate materials for magnetic heads consisting of 24–75 mol % of $\alpha$-$Al_2O_3$ and the remaining 76–25 mol % of $TiC_xO_yN_z$, or $TiC_xO_yN_z$ containing a small amount of additives, that has a NaCl-type structure which retain known characteristics required on such materials and have controlled sizes of crystallites of $Al_2O_3$ and $TiC_xO_yN_z$, uniformly dispersed $TiC_xO_yN_z$ crystallites and, if any, additive elements, in which internal stress is relieved. The materials are intended for eliminating problems in machining to form steps and thus for fabricating high-precision thin-film heads for high-density recording.

7 Claims, No Drawings

SUBSTRATE MATERIALS FOR MAGNETIC HEADS WITH LOW FLYING HEIGHT

BACKGROUND OF THE INVENTION

1. Field of the Invention

The present invention is related to alumina-based substrate materials for magnetic heads with low flying height and suitable for precision working such as plasma or thermally induced machining, intended for use in thin-film head sliders for hard disk drives in which the head is situated at a very small distance from the recording medium, transverse pressure contours (TPC) for thin-film tape recording devices, or advanced air bearings (AAB).

2. Description of the Prior Art

Alumina-based materials for magnetic heads have been designed considering, principally, the following characteristics:

(1) Chipping resistance in cutting,
(2) Excellent machinability in cutting and lapping, and
(3) Low friction in contact start-stop (CSS), which depends on the lubrication characteristics of the material.

The characteristic ① above is indispensable to form an air bearing surface (ABS), i.e. the contact surface between the magnetic head and the recording medium. An ABS has been formed conventionally by machining work. A head with numerous chippings on the ABS therefore showed poor flying height and lubrication characteristics. Also, a material that tends to chip while being machined requires a low machining speed for precision machining for the ABS.

The characteristic ② above relates chiefly to the throughput: a material difficult to cut and machine has requires a prolonged period for ABS machining.

The characteristic ③ above relates to the reliability of the head: a material with poor lubrication tends to show a low durability in repeated CSS.

Recent introduction of plasma machining, including ion beam etching (IBE) and reactive ion etching (RIE), or thermally induced machining including laser machining, instead of mechanical cutting and grinding, for ABS formation has rendered the characteristics ① and ② above rather unimportant.

The friction between the head and the medium, as referred to in ③ above, depends on the pressure and contact area of the two elements as well as the lubrication characteristics of the head material. For conventional large inductive heads, the contribution of the lubrication characteristics of the head material is important because of the relatively large contact area of the head with the medium, which translates into rather severe requirements upon the material. However, recent models of heads have contact areas with the medium smaller by a factor of 4 to 10 than conventional heads, as well as pressure against the medium lower by a factor of 3 to 10, thus making requirements on the lubrication characteristics of the material less stringent.

On the other hand, thin film heads have progressed from the conventional standard slider (100% slider, with a 4-mm thick substrate) to the micro-slider (70% slider, with a 2.8-mm thick substrate), nano-slider (50% slider, with a 2-mm thick substrate) and pico-slider (30% slider, with a 1.2-mm thick substrate). The femto-slider (10% slider, with a 0.4-mm thick substrate) is under development for future use.

Such miniaturization of the head has entailed reduction of the head flying height from 0.3 μm to 0.2 and from 0.075 μm to 0.05 μm in the most recent models.

These changes represent improvements for higher recording density. The same objective has prompted the replacement of inductive heads by magnetoresistive (MR) heads. This has greatly changed requirements on head materials, of which some important ones are described below.

④ Magnetoresistive heads with low, stable flying height require a far more complicated head pattern than conventional heads. Such a head pattern can only be realized by plasma or thermally induced machining as mentioned earlier. Also, the pattern requires finishing precision of ±1–3 μm and a surface roughness after machining less than about 1/10 times etching depth. The substrate should therefore have a low surface roughness after plasma or any other machining.

⑤ Thin film heads undergo magnetic annealing at 600°–700° C. during the production process, since sendust or other alloys that need magnetic annealing at high temperatures are used in the magnetic layer for MR heads.

This heat cycle reduces the bond strength between alumina and TiC particles and, consequently, makes the TiC particles tend to pull out during lapping of the ABS. This exerts an adverse effect on the lubrication characteristics in CSS as mentioned in ③ above. Therefore, a requirement for the substrate is that TiC particles do not pull out even after magnetic annealing.

⑥ It has recently been recognized that deformation of the substrate during magnetic annealing mentioned above causes deterioration of positioning accuracy in photolithography and of magnetic characteristics of the head. The substrate is therefore required to show no deformation during magnetic annealing.

⑦ Characteristics of MR heads are strongly affected by surface roughness because they can be as thin as several tens of nanometers. The device is formed on a substrate sputtered with an alumina film. Too thick an alumina film may lead to large warp during magnetic annealing at high temperatures. On the other hand, if the alumina film is thin, its quality will be easily affected by defects in the substrate. Since the size of defects in the substrate depends on the crystal grain size, the grains constituting the substrate should be as fine as possible.

The inventors have proposed in JP 86/50906 a sintered body consisting of 30–50 wt % of (TiC+TiO$_2$) and a balance of alumina to which is added a small amount of a machinability agent such as MgO and Y$_2$O$_3$, a sintering aid. The inventors have also disclosed in JP 90/62511 a magnetic head material consisting of alumina partially substituted with MgO or other machinability agents containing 5–45 weight % of titanium carbide, ZrO$_2$, Y$_2$O$_3$, and AlN. More recently, JP 94/2618 discloses a ceramic material for magnetic head sliders consisting of 100 weight parts of mixture of alumina with 5–40 wt % of titanium carbide, 0.01–5 weight parts each of Mn and Ti oxides, and Ga, Ba, Ce and Ni oxides.

While these materials do satisfy the requirements described in ①–③ above, their surface roughness after etching is as great as 1/4–1/3 times the etching depth, thus failing to meet the requirement of stable flying height as described in ④ above. When a substrate made of said materials is lapped to form the ABS after heat treatment at 600°–700° C., TiC particles pull-out to deteriorate the surface roughness by a factor of 2–5, which causes problems such as poor CSS characteristics or head crash as described in ⑤. As for the requirement ⑥ above, a substrate 3 inches in diameter and 2 mm thick heat-treated at 600°–700° C. shows a 5–20 μm of warp which greatly impairs positioning accuracy in photolithography and magnetic properties. Said materials also have nonuniform grain size distributions which can bring about some large particles (20–100 μm) in the substrate, which may introduce defects as in the case of large sizes. Therefore the materials do not meet the requirement ⑦ above. This is because of poor distribution of TiC in the material due to the absence of oxygen and nitrogen in TiC.

Thus, it is difficult to produce sliders for high-density recording such as those for TPC or AAB with high throughput using conventional $Al_2O_3$—TiC substrates because of the inability to meet the requirements of items ③ to ⑦ in the $Al_2O_3$—TiC substrates.

SUMMARY OF THE INVENTION

The object of the present invention is to provide materials for magnetic head substrates based on the system $Al_2O_3$—$TiC_xO_yN_z$ that meet the requirements presented in ③–⑦ above, while retaining the characteristics obtained so far, and allow production of sliders of low flying height, high recording density magnetic heads such as magnetic resistive heads with TPC and AAB.

The most important factors in realizing the magnetic head materials according to the invention are $Al_2O_3$—$TiC_xO_yN_z$ materials with strongly bonded crystallites and a sintering aid used in an amount as small as possible. In IBE or RIE of a sintered body, as is practiced commonly in forming the ABS of low flying height magnetic heads for high density recording, the sintering aid often remains as large protrusions on the surface. Therefore, a low flying height magnetic head should use as small amount of a sintering aid as possible to realize stable flying height characteristics. Even without such an additive, the difference in IBE rates of $Al_2O_3$ and TiC (125 and 90Å/min, respectively) gives rise to a rather rough surface after etching. The grain boundary between TiC and $Al_2O_3$ crystallites is etched still more crystallite size of α-$Al_2O_3$ and $TiC_xO_yN_z$, the ratio of these crystallite sizes, and the degree of dispersion of $TiC_xO_yN_z$, and secondly on the amount and dispersion of compounds formed from minor components (i.e. components other than $Al_2O_3$ and $TiC_xO_yN_z$); and that the internal stress in the substrate is released during magnetic annealing to produce warp of the material; by controlling the composition, uniformity of dispersion of each component, and crystallite size; and by additional annealing for stress removal after sintering.

The present invention thus provides substrate materials for magnetic heads consisting of 24–75 mol % of α-$Al_2O_3$ and the remaining 76–25 mol % of a NaCl-type phase with an average composition $TiC_xO_yN_z$, where $0.5 \leq X \leq 0.995$, $0.005 \leq Y \leq 0.30$, $0 \leq Z \leq 0.20$, and $0.505 \leq X+Y+Z \leq 1$; such materials of the composition described above containing 2 mol % or less of $TiO_n$ where $n \leq 2$; such materials consisting of 100 mol % of a base material of a composition indicated above, a compound containing 0.8 mol % or less of a metal selected from Mg, Ca, Zr and Cr, and a compound containing 0.4 mol % or less of Y or other rare earth metal, the total concentration of said metal and rare earth elements being in a range of 0 to 0.8 mol %; and such materials with uniform dispersion of the components which have an average crystallite size of 0.3–1.5 μm, and a ratio of the crystallite size of $TiC_xO_yN_z$ to that of $Al_2O_3$ of 0.3–1.0, with any 9 μm² square area (3 μm×3 μm) on the surface containing either at least one crystallite of, or one aggregate particle containing, $TiC_xO_yN_z$, or a part of said crystallite or aggregate particle.

Another feature of the substrate material according to the invention is that the remaining internal stress in the material is 1 MPa or less.

The $Al_2O_3$—$TiC_xO_yN_z$ material according to the invention is, in particular, advantageously used in low flying height magnetic heads such as micro-, nano-, pico- or femto-sliders.

The substrate materials according to the invention can be prepared by grinding and screening of $TiC_xO_yN_z$ which is obtained either by heating a mixture of components, selected from TiC, titanium oxides, titanium nitrides, titanium carbide oxides, carbon, titanium carbide nitrides, and titanium carbide oxide nitrides so that the content of oxygen and nitrogen conform to the compositions specified above, in vacuum or inert, CO, $CO_2$, $N_2$ or $CH_4$ atmosphere, or by gas phase synthesis from $TiCl_4$, $CH_4$, CO, $N_2$ and $NH_3$.

Alternatively, the substrate materials according to the invention can be obtained by mixing uniformly in a pulverizer titanium carbide and titanium oxide with known content of oxygen, binding carbon, free carbon and nitrogen, carbon powder, and, as needed, titanium nitride or other compounds to a specified composition, with $Al_2O_3$ and a small amount of additives, and drying and screening the resultant slurry so that the components do not segregate or coagulate, sintering said dried slurry by hot pressing (HP) or hot isostatic pressing (HIP) in an atmosphere so controlled that the components TiC, $TiO_m$ ($m \leq 2$) and C releases CO gas to attain the composition $TiC_xO_yN_z$ in the sintering stage of HP or preliminary sintering stage of HIP.

The $Al_2O_3$ powder used as a starting material should have a purity of 99.9% or higher, a maximum particle size of 2.5 μm or less, an average particle size of 1.5 μm or less, or preferably 1.0 μm or less, and as low concentrations as possible of magnetic metal elements such as Fe, Co or Ni.

A specified amount of such an $Al_2O_3$ powder, $TiC_xO_yN_z$ or components to form $TiC_xO_yN_z$, and a small amount of additives containing at least one of MgO, CaO, $ZrO_2$ or $Cr_2O_3$ and at least one oxide of Y, Ce, Eu, Dy, Yb, or other rare earth metals are weighed, wet milled and mixed in a pulverizer protected against impurities, dried and screened to give a starting powder for sintering.

The process of milling and mixing described above should be performed so that the resultant particles have an average size of 1.5 μm or less or preferably 1 μm or less, and a maximum size of 3 μm or preferably 2 μm or less, while the drying process described above so that the components do not coagulate or segregate, in order to obtain a uniformly dispersed powder for sintering. Such powder for sintering is then formed into a thin plate, undergoes preliminary sintering in a non-oxidizing atmosphere such as CO or $N_2$ or an inert gas atmosphere such as Ar, and finally densified by HIP. Alternatively, said powder is placed in a graphite die and hot-pressed in a known manner in a non-oxidizing atmosphere such as CO or $N_2$, an inert gas atmosphere or vacuum. The sintered body obtained in HP or HIP as described above is further heat-treated at 1200°–1700° C. in an atmosphere similar to those mentioned above, and cooled at a controlled rate of 0.2°–7° C./min, to yield a substrate material for magnetic heads with relaxed internal stress.

The requirements upon the substrate materials for magnetic heads according to the invention are: ① resistance to chipping during cutting, ② excellent machinability in cutting and lapping, ③ low friction in CSS, ④ low surface roughness after plasma machining, such as IBE or RIE, ⑤ resistance to pulling out of TiC particles after magnetic annealing or other heat treatments, ⑥ resistance to deformation during magnetic annealing or other heat treatments, and ⑦ small crystalline and defect sizes. Of these, ①, ②, ③ and ⑦ are related to volume and area ratios of α-$Al_2O_3$ and $TiC_xO_yN_z$ in the material and can therefore be conveniently discussed in terms of volume percentages. However, characteristics related to ②, ④, ⑤ and ⑥ depend upon the number of atoms such as Mg, Ca, Zr, Cr or rare earths, and therefore molar percentage is appropriate in discussion. Hereinafter the composition is always expressed in molar percentage. In the present invention, 24–75 mol % of α-$Al_2O_3$ corresponds to 40–85 vol %, and 76–25 mol % of $TiC_xO_yN_z$ to 60–15 vol %.

α-$Al_2O_3$ and $TiC_xO_yN_z$ form the matrix in the substrate materials for magnetic heads according to the invention, which may contain 2 mol % or less of a suboxide of titanium $TiO_n$ ($n \leq 2$). Oxygen in $TiC_xO_yN_z$ contributes to the bonding between α-$Al_2O_3$ and $TiC_xO_yN_z$ and, consequently, lowering sintering temperature through exchange or sharing of oxygen atoms at the boundaries of the two component phases, whether $TiC_xO_yN_z$ has been in the starting material or formed during sintering. This in turn produces fine crystallites and strengthens the grain boundaries of the two component phases. Most of the titanium oxide ($TiO_m$, $m \leq 2$), one of the starting materials of $TiC_xO_yN_z$, reacts with TiC, TiN, and/or nitrogen or carbon to form $TiC_xO_yN_z$ and CO, while a small part of it forms suboxides of titanium ($TiO_n$, $n \leq 2$) such as TiO or $Ti_2O_{3.03}$.

A part of titanium oxide ($TiO_m$, $m \leq 2$) may also react with $Al_2O_3$, when the temperature increases during sintering, and precipitate as $TiO_n$ during cooling after sintering.

The solubility limit of oxygen in TiC crystals is related to the carbon content in $TiC_xO_yN_z$, and also contributes to the strength of boundaries with α-$Al_2O_3$, while nitrogen in $TiC_xO_yN_z$ inhibits its grain growth, producing a fine-grained structure.

In the present invention, y in $TiC_xO_yN_z$ should satisfy $0.005 \leq Y \leq 0.3$. If y is smaller than 0.005, only an insufficient amount of oxygen is available for diffusion and bonding, which results in weak bonding to other components, low sinterability of the material at lower temperatures, large grain sizes, unsatisfactory dispersion of the phase, and weak boundaries with α-$Al_2O_3$, thus increasing the number of particles that pull out during production of magnetic heads. With Y>0.3, oxygen reacts with diamond in the cutting blade used for machining the material which makes cutting difficult, and leads to problems in the geometrical precision of the head (not the precision of ABS machining), such as chipping. Preferably Y should satisfy $0.02 \leq Y \leq 0.12$.

The carbon content X in $TiC_xO_yN_z$ should be in a range of $0.5 \leq X \leq 0.995$ according to the invention. If X<0.5 the hardness of the product is very low and readily worn in CSS. The TiC-based phase with x greater than 0.995 will not accept a sufficient amount of oxygen and have only a weak bonding with α-$Al_2O_3$, thus pulling out many particles during machining. Preferably x should satisfy $0.7 \leq X \leq 0.9$.

The nitrogen content z should satisfy $0 \leq Z \leq 0.20$. Naturally no grain growth inhibitor effect by nitrogen is available at Z=0, but a fine grain structure can still be achieved by careful control of sintering parameters. On the other hand, if Z>0.2, nitrogen reacts with diamond in the cutting wheel in precedence over oxygen, disturbing the cutting process. Preferably Z should satisfy $0.005 \leq Z \leq 0.07$. As a consequence, X+Y+Z should be in a range between 0.505 and 1, since $TiC_xO_yN_z$ is formed by substituting O and N for a part of C in TiC. To minimize reaction of the material with atmosphere in the head production process, it is desirable for X+Y+Z to be close to 1 where the lattice point in $TiC_xO_yN_z$ is saturated.

The molar percentage of the $TiC_xO_yN_z$ phase in the matrix is related to tribological characteristics of the head with the recording medium.

The concentration of $TiC_xO_yN_z$ should preferably be 25–76 mol %. At concentrations lower than 25 mol %, $Al_2O_3$ grains are not effectively prevented from growing, and similarly to pure $Al_2O_3$, cutting behavior is so poor that problems in the geometrical precision of the head (not the precision of ABS machining), such as chipping, are caused. Also low electroconductivity of such compositions leads to electrostatic charge on friction with the medium, which attracts dust and may induce head crush. On the other hand, at concentrations higher than 76 mol %, it retards densification, and the resulting numerous small pores prohibits formation of thin-film circuits on the surface, although the material itself can be precisely machined.

Preferably, the concentration of $TiC_xO_yN_z$ should be 40–60 mol %.

With respect to 100 mol % of the matrix consisting of $Al_2O_3$ and $TiC_xO_yN_z$, or less than 2 mol % of $TiO_n$ ($n \leq 2$) in addition to these two components, the material according to the invention should contain less than 0.8 mol %, or preferably less than 0.30 mol %, of at least one metallic element selected from Mg, Ca, Zr and Cr, and less than 0.4 mol %, or preferably less than 0.10 mol %, of at least one rare earth metal such as Ce, Y, Eu, Dy or Yb, the total concentration of said metal and rare earth metal being in a range of 0–0.80 mol %, preferably 0–0.3 mol %, or still more preferable 0.04–0.15 mol % for desirable sinterability. If Mg or other metals, the oxides of which suppress the grain growth of $Al_2O_3$, exist in excess of 0.8 mol %, the surface roughness of the sintered body after etching is too great. A similar undesirable effect is brought about if the content of said rare earth metals, whose oxides are sintering aids, exceeds 0.4 mol % or the total concentration of these two components exceeds 0.8 mol %.

These additional components may be omitted for HP which can produce suitable substrate materials without additives. Addition of rare earth oxides only results in satisfactory products for HIP. However, the simultaneous use of the two groups of elements assures the quality of the product regardless of the sintering processes.

Although these elements are most conveniently added as oxides to the starting materials, hydroxides, carbonates, or other organic or inorganic salts can also be used as far as they decompose to yield corresponding oxides during processing or sintering of the starting mixture.

The concentration of these additives are expressed in molar percentage of each metal throughout the specification, because they form a number of complicated compound oxides and intermetallic compounds during sintering in a complicated manner. For example, Mg exists as MgO, $MgAl_2O_4$ (spinel), $MgTi_2O_5$ or other reaction products. Rare earth elements form oxides, garnets containing $Al_2O_3$ compound oxide containing MgO, or intermetallics with at least one of Al, Mg, Ca, Zr and Cr. For instance Y forms $Y_2O_3$, yttrium aluminum garnet, YAl or $Y_2C_3$ reaction products.

The matrix consisting of $Al_2O_3$ and $TiC_xO_yN_z$, or less than 2 mol % of $TiO_n$ ($n \leq 2$) in addition to these two components should have an average crystallite size of 0.3–1.5 μm. Smaller crystallite sizes are favorable in principle, but average sizes less than 0.3 μm may cause particles to pull out on contact with the medium and thus head crash. Crystallites larger than 1.5 μm yield too rough a surface after etching. A still more preferable range of the average crystallite size of the matrix is 0.3–1.0 μm.

Etching, including plasma machining, attacks $Al_2O_3$ more rapidly than $TiC_xO_yN_z$, and still more rapidly grain boundaries. Large crystallites of $TiC_xO_yN_z$ remain therefore as large protrusions on the surface after etching. Considering this effect, the ratio of the crystallite size of $TiC_xO_yN_z$ to that of $Al_2O_3$ should be 1.0 or less. However, if this ratio is less than 0.3, the surface after etching will be rough again, even if the average crystallite size falls within the range shown above, because of relatively large $Al_2O_3$ particles whose diameter is 3.3 times or more that of $TiC_xO_yN_z$.

An important feature of the substrate materials according to the invention is uniform dispersion of $TiC_xO_yN_z$ crystallites. This is achieved, as described earlier, by properly controlling milling and mixing of the starting materials, preparation of sintering powder, and sintering. Problems caused by nonuniform crystallite distribution were also described earlier. When any part of the substrate material is precisely lapped and observed under an electron microscope at a magnification of 5000, if at least one crystallite or aggregate of $TiC_xO_yN_z$ that appears as a white spot is seen to be within a square area of 9 $\mu m^2$ (3 $\mu m \times 3$ $\mu m$), a precise etched surface can be obtained. Even when its concentration is decreased toward 25 mol % where white spots of $TiC_xO_yN_z$, now decreased in number, may not be observed within a 9 $\mu m^2$ area, a uniformly distributed structure can be formed by controlling the starting material or milling and mixing thereof as described above.

An additional feature of the present invention is to prevent the substrate from warping by annealing to remove as much internal stress as possible. It is known to anneal a ceramic substrate to some extent during cooling after HP. However, a very low cooling rate is required in this circumstance because the substrate is in contact with the sintering mold around it. It is more economical to anneal the substrate after sintering in a condition with little constraint on thermal expansion and contraction and remove internal stress nearly perfectly. The annealing temperature, which depends on the composition of the substrate, should be about 70% of the sintering temperature or higher. However, it is uneconomical, just as is prolonged annealing at low temperatures, to heat the substrate again up to the sintering temperature, which may cause excessive grain growth. This factor limits the annealing temperature to lower than 95% of the sintering temperature. The annealing period depends on the annealing temperature; it is preferably 15 min to 10 h for annealing at 1200°–1700° C. Annealing shorter than 15 min does not relax the internal stress sufficiently, while the relaxation process saturates in one longer than 10 h, making the latter uneconomical. A still more preferable range of annealing condition is 30 min to 5 h at 1250°–1650° C.

The internal stress within the material after annealing is calculated by the equation $$\sigma = (B/A) \times (Et/r^2) \times \delta,$$

where A and B are constants depending on the geometry of the material (A=0.67 and B=1.24), E the Young's modulus of the material, t the thickness of the substrate, r the radius of a disk prepared from the material, and $\delta$ the warp of said disk during annealing at a temperature of 70% or higher of the sintering temperature, should preferably be lower than 1 MPa to limit warp during an additional annealing for quality assurance of the substrate at temperatures 70% or higher then the sintering temperature. Internal stresses higher than 1 MPa results in a large deformation in the magnetic annealing of the substrate fabricated therefrom, thus greatly impairing the positioning accuracy in photolithography and characteristics of the magnetic film.

DESCRIPTION OF PREFERRED EMBODIMENTS

Compositions-Substrate materials for magnetic heads were prepared which consists of basic components comprising 24–75 mol % of $Al_2O_3$ and the remaining 76–25 mol % of $TiC_xO_yN_z$, at least one compound of a metallic element selected from Mg, Ca, Zr and Cr which provides 0.8 mol % or less of said metallic element(s) with respect to 100 mol % of said matrix, and at least one rare earth compound which provides 0.4 mol % or less of said rare earth element(s) with respect to 100 mol % of said matrix, the total concentration of said metal and rare earth being in a range of 0–0.80 mol %, and said matrix containing 2 mol % or less of $TiO_n$ ($n \leq 2$) in addition to $Al_2O_3$ and $TiC_xO_yN_z$.

Preparation of powders—The starting materials listed below were mixed to give the compositions shown in Tables 4, 5 and 6.

To obtain $TiC_xO_yN_z$ powder, TiC, $TiO_2$, TiN and C were mixed in proportions that satisfy $0.5 \leq X \leq 0.995$, $0.005 \leq Y \leq 0.30$, $0 \leq Z \leq 0.20$ and $0.505 \leq X+Y+Z \leq 1$, heated to 500°–1500° C. in a vacuum or in an inert or nonoxidizing atmosphere to produce a cake of $TiC_xO_yN_z$, which was then ground in a ball mill to an average particle size of 1.5 $\mu m$ or less and a maximum particle size of 3 $\mu m$ or less.

To obtain $Al_2O_3$ powder. Powders with a purity of 99.95% or higher, an average particle size of 0.6 $\mu m$, and a maximum particle size of 3 $\mu m$ or less were used.

Additional components (oxides of Mg, Ca, Zr and Cr, and oxides of Y, Ce, Eu, Dy and Yb) were obtained using powders with a purity of 99% or higher and an average particle size of 1.5 $\mu m$ or less.

Carbon powder was obtained using powders with a purity of 99% or higher and an average particle size of 1 $\mu m$ or less.

The starting powders listed above were wet-ground in a ball mill or a high-performance pulverizer protected against extraneous impurities to an average particle size of 1.0 $\mu m$ or less and a maximum particle size of 2 $\mu m$, and passed through a 5 $\mu m$ filter to remove fragments of grinding medium, if any. Since $TiC_xO_yN_z$ is ground more rapidly than $Al_2O_3$ in this grinding process, a slurry with a particle size specified above is obtained. The slurry was dried, for example in a spray granulator, within a short time period so that no separation of a component occurred, and screened to give a powder for sintering.

To effect compaction and sintering, dense sintered bodies were prepared either by pressing said powder for sintering in a mold with specified dimensions to form plate-like compacts, preliminarily sintering the compacts to a relative density of 95–98.5% under the conditions shown in Table 1, and performing HIP; or by filling said powder uniformly in a graphite mold, and performing HP under the conditions shown in Table 1.

As low temperatures as acceptable for densification were chosen for HIP and HP described above to avoid excessive sintering. Detailed conditions are shown in Table 1.

TABLE 1

| | Preliminary sintering | Full sintering |
|---|---|---|
| HP | None | Sintering temp.: 1500° C.~1800° C.<br>Sintering time: 60~120 min.<br>Sintering pressure: 100~300 kg/cm$^2$<br>Sintering atmosphere: Argon |
| HIP | Compaction pressure: 1 ton/cm$^2$<br>Sintering temp.: 1650~1850° C.<br>Sintering time: 60~120 min.<br>Sintering atmosphere: Argon | Sintering temp.: 1400° C.~1600° C.<br>Sintering time: 60~120 min.<br>Sintering pressure: 500~2000 kg/cm$^2$<br>Sintering atmosphere: Argon |

The sintered bodies obtained showed relative densities higher than 99%, no segregation of additive elements such as Mg and rare earth metals, uniform distribution of $Al_2O_3$ and $TiC_xO_yN_z$ crystallites, average crystallite sizes of 0.3–1.5 μm, ratios of the average crystallite size of $TiC_xO_yN_z$ to that of $Al_2O_3$ of 0.3–1.0, and a fine, uniform grain structure.

The sintered bodies were annealed by placing them in a furnace at 1200°–1700° C. for at least 15 min in an argon atmosphere and subsequently cooling. An example of annealing conditions is shown in Table 2.

TABLE 2

| Annealing temperature | Annealing time | Cooling rate | Atmosphere |
|---|---|---|---|
| 1400° C. | 4 Hr | 1° C./min. | Argon |

The thickness of the sintered bodies had been given an allowance for deformation due to stress relaxation during annealing, and both faces of the bodies after annealing were machined to give substrate materials with a specified thickness.

The materials thus obtained showed no change in crystallite size during annealing. The relaxation of the internal stress prevented excessive deformation during subsequent processes to prepare substrates for magnetic heads.

Evaluation of sintered bodies: Table 1 shows the conditions of compaction and sintering, and Table 2 shows the condition of annealing after sintering.

Table 3 shows, for comparison, compositions of conventional substrate materials for magnetic heads.

Table 4 shows, for comparison, compositions of substrate materials for magnetic heads not covered by the present invention.

Table 5 shows compositions of materials both within and without the scope of the invention.

Tables 6 and 7 show compositions of sintered bodies according to the invention intended for substrates for magnetic heads.

Table 8 shows, as a reference, examples of compositions expressed in various units for a particular set of values X, Y, Z in $TiC_xO_yN_z$.

Table 9 summarizes the results of evaluation of substrate materials for magnetic heads according to the invention and those not covered by the invention.

The crystallite sizes cited in the table were measured on electron photomicrographs at a magnification of 5000 of fracture surfaces of the materials.

Table 10 shows the detailed evaluation criteria.

TABLE 3

| | Composition in weight % (mol %) | | | Additives in weight part (mol % M) | | Sintering method |
|---|---|---|---|---|---|---|
| | $Al_2O_3$ | TiC | $TiO_2$ | MgO | $Y_2O_3$ | |
| 1 | 63 (50.6) | 33.3 (45.6) | 3.7 (3.8) | 5.0 (10.17) | 0.25 (0.18) | HP |
| 2 | 63 (50.6) | 33.3 (45.6) | 3.7 (3.8) | 2.0 (4.07) | 0.25 (0.18) | HP |
| 3 | 63 (50.6) | 33.3 (45.6) | 3.7 (3.8) | 1.0 (2.03) | 0.25 (0.18) | HP |
| 4 | 63 (50.6) | 33.3 (45.6) | 3.7 (3.8) | 0.5 (1.02) | 0.25 (0.18) | HP |
| 5 | 63 (50.6) | 33.3 (45.6) | 3.7 (3.8) | 1.0 (2.03) | 2.00 (1.45) | HP |
| 6 | 63 (50.6) | 33.3 (45.6) | 3.7 (3.8) | 1.0 (2.03) | 1.00 (0.73) | HP |
| 7 | 63 (50.6) | 33.3 (45.6) | 3.7 (3.8) | 1.0 (2.03) | 0.50 (0.36) | HP |
| 8 | 63 (50.6) | 33.3 (45.6) | 3.7 (3.8) | 1.0 (2.03) | 0.10 (0.07) | HP |
| 9 | 63 (50.6) | 33.3 (45.6) | 3.7 (3.8) | 1.0 (2.03) | 0.05 (0.04) | HP |

Notes:
1) The compositions shown relate to the powders for sintering.
2) The proportions of MgO or other additives are with respect to $Al_2O_3 + TiC + TiO_2 = 100$ weight parts.
3) The molar percentages of M are with respect to $Al_2O_3 + TiC + TiO_2 = 100$ mol %.
4) M means metallic elements.

TABLE 4

| | mol % | | Mol % of metals derived from additives | | | | | | | | |
|---|---|---|---|---|---|---|---|---|---|---|---|
| No. | $Al_2O_3$ | $TiC_XO_YN_Z$ | Mg (MgO) | Ca (CaO) | Zr ($ZrO_2$) | Cr ($Cr_2O_3$) | Ce ($Ce_2O_3$) | Y ($Y_2O_3$) | Eu ($Eu_2O_3$) | Dy ($Dy_2O_3$) | Yb ($Yb_2O_3$) |
| 10 | 46.85 | 53.15 | | | | | | | | | |
| 11 | 46.85 | 53.15 | 0.80 | | | | | 0.40 | | | |
| 12 | 47.83 | 52.17 | | | 1.00 | | 0.40 | | | | |
| 13 | 20.26 | 79.74 | | | | 0.20 | | | | 0.20 | |
| 14 | 80.94 | 19.06 | 0.10 | | | | | 0.04 | | | |
| 15 | 52.54 | 47.46 | | 0.10 | | | | | | 0.20 | |
| 16 | 53.25 | 46.75 | | 0.02 | | | | | | 0.12 | |
| 17 | 53.25 | 46.75 | | 0.04 | | | | | | | 0.04 |
| 18 | 52.58 | 47.42 | | | 0.02 | | | | | 0.08 | |
| 19 | 54.23 | 45.77 | | | | 0.02 | 0.04 | | | | |

| | mol % | | | $TiC_XO_YN_Z$ | | | |
|---|---|---|---|---|---|---|---|
| No. | $Al_2O_3$ | $TiC_XO_YN_Z$ | X | Y | Z | | Sintering method |
| 10 | 46.85 | 53.15 | 0.995 | 0.001 | 0.000 | | HP |
| 11 | 46.85 | 53.15 | 0.990 | 0.003 | 0.002 | | HP |
| 12 | 47.83 | 52.17 | 0.800 | 0.003 | 0.004 | | HIP |
| 13 | 20.26 | 79.74 | 0.750 | 0.200 | 0.040 | | HP |
| 14 | 80.94 | 19.06 | 0.700 | 0.250 | 0.030 | | HIP |
| 15 | 52.54 | 47.46 | 0.650 | 0.250 | 0.050 | | HP |
| 16 | 53.25 | 46.75 | 0.850 | 0.004 | 0.004 | | HP |
| 17 | 53.25 | 46.75 | 0.850 | 0.004 | 0.004 | | HP |
| 18 | 52.58 | 47.42 | 0.750 | 0.200 | 0.004 | | HP |
| 19 | 54.23 | 45.77 | 0.450 | 0.005 | 0.220 | | HP |

Notes:
1) $Al_2O_3$ powder as the starting material of No.16–No.18 is the same as the one used in the embodiment.
2) The average particle size of $TiC_XO_YN_Z$ used in No.16–No.18 is 3.5 μm.
3) The molar percentage of metallic elements are with respect to $Al_2O_3$ + $TiC_XO_YN_Z$ = 100 mol %.

TABLE 5

| | mol % | | Mol % of metals derived from additives | | | | | | | | |
|---|---|---|---|---|---|---|---|---|---|---|---|
| No. | $Al_2O_3$ | $TiC_XO_YN_Z$ | Mg (MgO) | Ca (CaO) | Zr ($ZrO_2$) | Cr ($Cr_2O_3$) | Ce ($Ce_2O_3$) | Y ($Y_2O_3$) | Eu ($Eu_2O_3$) | Dy ($Dy_2O_3$) | Yb ($Yb_2O_3$) |
| 18-1 | 23.0 | 77.0 | 0.4 | | | | | 0.04 | | | |
| 18-2 | 77.0 | 23.0 | 0.4 | | | | | 0.04 | | | |
| 18-3 | 75.0 | 25.0 | 0.6 | | | | | 0.20 | | | |
| 18-4 | 52.58 | 47.42 | 0.9 | | | | | | | | |
| 18-5 | 52.58 | 47.42 | 0.8 | | | | | | | | |
| 18-6 | 52.58 | 47.42 | 0.7 | | | | | | | | |
| 18-7 | 52.58 | 47.42 | | | | | | 0.5 | | | |
| 18-8 | 52.58 | 47.42 | 0.8 | | | | | 0.10 | | | |
| 18-9 | 52.58 | 47.42 | | | 0.8 | | | | | 0.04 | |
| 18-10 | 52.58 | 47.42 | 0.7 | | | | | 0.10 | | | |
| 18-11 | 52.58 | 47.42 | | | | 0.7 | | | | | 0.10 |
| 18-12 | 52.58 | 47.42 | 0.5 | | | | | 0.4 | | | |
| 18-13 | 52.58 | 47.42 | 0.4 | | | | | 0.04 | | | |
| 18-14 | 52.58 | 47.42 | 0.4 | | | | | 0.04 | | | |
| 18-15 | 52.58 | 47.42 | 0.4 | | | | | 0.04 | | | |
| 18-16 | 52.58 | 47.42 | 0.4 | | | | | 0.40 | | | |

Notes:
1) The values of X, Y and Z in No.18-1 to No.18-12 are identical with those in No.18 in Table 4; the average particle size was 1.3 μm.
2) x = 0.995, y = 0.001, z = 0.001 in $TiC_XO_YN_Z$ used in No.18-13.
3) x = 0.996, y = 0.002, z = 0.001 in $TiC_XO_YN_Z$ used in No.18-14.
4) x = 0.600, y = 0.35, z = 0.002 in $TiC_XO_YN_Z$ used in No.18-15.
5) x = 0.700, y = 0.07, z = 0.20 in $TiC_XO_YN_Z$ used in No.18-16.
6) All specimens were sintered by HP. Notes 5 and 4, Table 4 applies here.

TABLE 6

| | mol % | | Mol % of metals derived from additives | | | | | | | | |
|---|---|---|---|---|---|---|---|---|---|---|---|
| No. | Al$_2$O$_3$ | TiC$_X$O$_Y$N$_Z$ | Mg (MgO) | Ca (CaO) | Zr (ZrO$_2$) | Cr (Cr$_2$O$_3$) | Ce (Ce$_2$O$_3$) | Y (Y$_2$O$_3$) | Eu (Eu$_2$O$_3$) | Dy (Dy$_2$O$_3$) | Yb (Yb$_2$O$_3$) |
| 20 | 46.82 | 53.18 | | | | | | | | | |
| 21 | 46.93 | 53.07 | | | | | 0.04 | | | | |
| 22 | 46.81 | 53.19 | 0.02 | | | | | 0.04 | | | |
| 23 | 46.88 | 53.12 | 0.40 | | | | | 0.20 | | | |
| 24 | 46.88 | 53.12 | 0.20 | | 0.10 | | | 0.40 | | | |
| 25 | 46.92 | 53.08 | | 0.10 | 0.10 | | | | | | 0.20 |
| 26 | 47.17 | 52.83 | 0.30 | | | 0.10 | | 0.20 | | | |
| 27 | 46.91 | 53.09 | | | | | | 0.04 | 0.20 | | |
| 28 | 47.16 | 52.84 | | | | | | | 0.20 | | 0.20 |
| 29 | 46.97 | 53.03 | | 0.10 | | | 0.20 | | | | |
| 30 | 24.02 | 75.98 | 0.10 | | 0.10 | 0.10 | | 0.20 | | 0.20 | |
| 31 | 52.54 | 47.46 | | 0.02 | | | | | | | 0.04 |
| 32 | 52.43 | 47.57 | 0.04 | | | | | 0.04 | | | |
| 33 | 52.44 | 47.56 | | | | | | | | | |
| 34 | 52.54 | 47.46 | | 0.02 | | | | | | | |
| 35 | 52.53 | 47.47 | 0.40 | | | 0.02 | | | | | |
| 36 | 72.88 | 27.12 | 0.40 | | | 0.10 | | | | 0.20 | |
| 37 | 52.58 | 47.42 | 0.10 | | | | | 0.20 | | | |
| 38 | 52.58 | 47.42 | | | | | | 0.08 | | 0.08 | |
| 39 | 52.58 | 47.42 | | | | | | | | | 0.20 |
| 40 | 52.55 | 47.45 | | | 0.40 | | 0.20 | 0.20 | | | |

TABLE 7

| | TiC$_X$O$_Y$N$_Z$ | | | Sintering method |
|---|---|---|---|---|
| No. | X | Y | Z | |
| 20 | 0.900 | 0.050 | 0.040 | HP |
| 21 | 0.900 | 0.050 | 0.020 | HP |
| 22 | 0.900 | 0.070 | 0.020 | HP |
| 23 | 0.850 | 0.100 | 0.020 | HP |
| 24 | 0.850 | 0.100 | 0.020 | HIP |
| 25 | 0.820 | 0.120 | 0.020 | HIP |
| 26 | 0.850 | 0.050 | 0.020 | HIP |
| 27 | 0.800 | 0.120 | 0.040 | HIP |
| 28 | 0.530 | 0.280 | 0.070 | HIP |
| 29 | 0.800 | 0.100 | 0.050 | HIP |
| 30 | 0.920 | 0.050 | 0.020 | HIP |
| 31 | 0.880 | 0.100 | 0.000 | HP |
| 32 | 0.850 | 0.100 | 0.050 | HP |
| 33 | 0.800 | 0.150 | 0.040 | HP |
| 34 | 0.800 | 0.150 | 0.020 | HP |
| 35 | 0.650 | 0.280 | 0.020 | HP |
| 36 | 0.990 | 0.005 | 0.005 | HP |
| 37 | 0.850 | 0.100 | 0.020 | HIP |
| 38 | 0.850 | 0.100 | 0.020 | HIP |
| 39 | 0.850 | 0.100 | 0.020 | HIP |
| 40 | 0.950 | 0.030 | 0.010 | HIP |

Notes:
1) Values x, y, and z in TiC$_X$O$_Y$N$_Z$ were determined by analysis of C (IR absorption), N and O as well as x-ray diffraction.

TABLE 8

| Ex. | Al$_2$O$_3$ | | | TiC$_{0.85}$O$_{0.12}$N$_{0.02}$ | | | Mg | MgO | Y | Y$_2$O$_3$ |
|---|---|---|---|---|---|---|---|---|---|---|
| No. | mol % | vol. % | wt. % | mol % | vol. % | wt. % | mol % | wt. % | mol % | wt. % |
| a | 23.98 | 40.00 | 34.79 | 76.02 | 60.00 | 65.21 | 0.80 | 0.46 | 0.00 | 0.00 |
| b | 23.98 | 40.00 | 34.79 | 76.02 | 60.00 | 65.21 | 0.40 | 0.23 | 0.40 | 0.65 |
| c | 72.83 | 85.00 | 81.93 | 27.17 | 15.00 | 18.07 | 0.80 | 0.36 | 0.00 | 0.00 |
| d | 72.83 | 85.00 | 81.93 | 27.17 | 15.00 | 18.07 | 0.40 | 0.18 | 0.40 | 0.50 |

1) MgO and Mg are presented here as an example of additives and the metals contained therein.
2) Y and Y$_2$O$_3$ are presented here as an example of rare earth additives and the metals contained therein.

TABLE 9

| No. | Crystallite size | TiC$_x$O$_y$N$_z$/Al$_2$O$_3$ | Resistance to particle pull-out | CSS characteristics | Geometrical precision | Surface roughness after RIE | Warp | General evaluation |
|---|---|---|---|---|---|---|---|---|
| *1 | 1.20 | — | △ | o | x | x | x | x |
| *2 | 1.00 | — | △ | o | △ | x | x | x |
| *3 | 0.70 | — | o | o | o | x | x | x |
| *4 | 0.70 | — | o | o | o | x | x | x |
| *5 | 0.90 | — | △ | o | △ | x | x | x |
| *6 | 0.85 | — | △ | o | △ | x | x | x |
| *7 | 0.80 | — | △ | o | △ | x | x | x |
| *8 | 0.75 | — | o | o | o | x | x | x |
| *9 | 0.65 | — | o | o | o | x | x | x |
| *10 | 1.70 | 0.55 | x | o | o | o | ⊙ | x |
| *11 | 1.30 | 1.10 | △ | o | △ | x | ⊙ | x |
| *12 | 1.20 | 1.00 | △ | △ | x | x | ⊙ | x |
| *13 | 0.95 | 0.85 | o | △ | △ | △ | ⊙ | △ |
| *14 | 1.50 | 1.20 | x | x | △ | △ | ⊙ | x |
| *15 | 0.85 | 1.05 | △ | o | △ | △ | x | x |
| *16 | 2.00 | 1.50 | △ | o | x | x | ⊙ | x |
| *17 | 1.50 | 1.20 | △ | o | x | △ | ⊙ | x |
| *18 | 1.30 | 1.10 | △ | o | △ | △ | ⊙ | △ |
| *18-1 | 0.95 | 1.00 | △ | △ | o | △ | ⊙ | △ |
| *18-2 | 1.3 | 0.90 | o | △ | △ | △ | ⊙ | △ |
| 18-3 | 1.10 | 0.95 | o | o | o | o | ⊙ | o |
| *18-4 | 1.40 | 1.05 | o | o | o | △ | ⊙ | △ |
| 18-5 | 1.25 | 0.90 | o | o | o | o | ⊙ | o |
| 18-6 | 1.10 | 0.95 | o | o | o | o | ⊙ | o |
| *18-7 | 1.35 | 1.05 | △ | o | △ | △ | ⊙ | △ |
| *18-8 | 0.90 | 0.75 | o | o | o | △ | ⊙ | △ |
| *18-9 | 0.80 | 0.70 | o | o | o | △ | ⊙ | △ |
| 18-10 | 0.85 | 0.80 | o | o | o | o | ⊙ | o |
| 18-11 | 0.75 | 0.70 | o | o | o | o | ⊙ | o |
| *18-12 | 1.45 | 1.0 | △ | o | o | △ | ⊙ | △ |
| *18-13 | 1.30 | 0.95 | △ | o | o | o | ⊙ | △ |
| *18-14 | 1.05 | 0.90 | △ | o | o | o | ⊙ | △ |
| *18-15 | 1.00 | 0.85 | o | o | △ | o | ⊙ | △ |
| 18-16 | 1.20 | 0.95 | o | o | o | o | ⊙ | o |
| *19 | 1.25 | 1.00 | △ | △ | x | ⊙ | ⊙ | x |
| 20 | 0.85 | 0.65 | o | o | ⊙ | ⊙ | ⊙ | ⊙ |
| 21 | 0.75 | 0.60 | ⊙ | o | ⊙ | ⊙ | ⊙ | ⊙ |
| 22 | 0.70 | 0.65 | ⊙ | o | ⊙ | ⊙ | ⊙ | ⊙ |
| 23 | 0.80 | 0.70 | o | o | o | o | ⊙ | o |
| 24 | 0.90 | 0.70 | ⊙ | o | o | o | ⊙ | o |
| 25 | 0.80 | 0.60 | ⊙ | o | ⊙ | ⊙ | ⊙ | ⊙ |
| 26 | 0.95 | 0.75 | ⊙ | o | o | o | ⊙ | o |
| 27 | 0.95 | 0.70 | ⊙ | o | ⊙ | ⊙ | ⊙ | ⊙ |
| 28 | 0.90 | 0.70 | ⊙ | o | ⊙ | ⊙ | ⊙ | ⊙ |
| 29 | 0.85 | 0.65 | ⊙ | o | ⊙ | ⊙ | ⊙ | ⊙ |
| 30 | 0.80 | 0.70 | o | o | o | o | ⊙ | o |
| 31 | 0.70 | 0.55 | ⊙ | o | ⊙ | ⊙ | ⊙ | ⊙ |
| 32 | 0.70 | 0.60 | ⊙ | o | ⊙ | ⊙ | ⊙ | ⊙ |
| 33 | 0.70 | 0.60 | ⊙ | o | ⊙ | ⊙ | ⊙ | ⊙ |
| 34 | 0.75 | 0.60 | ⊙ | o | ⊙ | ⊙ | ⊙ | ⊙ |
| 35 | 1.40 | 0.50 | ⊙ | o | o | o | ⊙ | o |
| 36 | 1.30 | 0.55 | o | o | ⊙ | ⊙ | ⊙ | ⊙ |
| 37 | 1.10 | 0.80 | ⊙ | o | ⊙ | ⊙ | ⊙ | ⊙ |
| 38 | 0.30 | 0.75 | ⊙ | o | ⊙ | ⊙ | ⊙ | ⊙ |
| 39 | 1.00 | 0.70 | ⊙ | o | ⊙ | ⊙ | ⊙ | ⊙ |
| 40 | 1.50 | 0.80 | o | o | o | o | ⊙ | o |

Notes:
1) Asterisks designate comparative examples not covered by the invention.
2) CSS characteristics were evaluated in comparison with specimen No.3 which is a conventional material. The symbols mean:
x: Very poor.
△: Unsatisfactory.
o: Equivalent or superior to conventional materials; usable as substrate materials.
3) The general evaluation follows the worst mark in evaluation of specific items if these contain at least one x or △. For specimens that mark ⊙ and o only, the general evaluation follows the majority.
4) Specimens No.35 and No.36 had greater crystallite sizes due to sintering at higher temperatures.
5) In specimens No.37 to No.40, Al$_2$O$_3$ used corresponds to that in the embodiments described in the text, and TiC$_x$O$_y$N$_z$ used had a larger average particle size. No.38 was ground for a prolonged period.
6) ⊙ for warp indicates internal stresses of 1 MPa or lower.
7) No. 15 was no annealed.

TABLE 10

| Item | ⊙ | ○ | △ | × |
|---|---|---|---|---|
| Resistance to particle pull-out | 0–100 Å | 100–200 Å | 200–500 Å | 500 Å |
| Geometrical precision, undulation | 0–0.1 μm | 0.1–0.25 μm | 0.25–0.50 μm | 0.5 μm~ |
| Surface roughness | 0–1500 Å | 1500–2500 Å | 2500–5000 Å | 5000 Å |
| Warp, stress | 0–1 MPa | — | — | 1 MPa~ |

The ratio $TiC_xO_yN_z/Al_2O_3$ refers to the ratio of the average crystallite size of $TiC_xO_yN_z$ to that of $\alpha$-$Al_2O_3$. The crystallite size was measured by scanning electron microscopy of lapped and etched surfaces of the material at a magnification of 5000.

The resistance to particle pull-out was evaluated by surface roughness change measured with a contact roughness gauge before and after heating to 1000° C. in an inert atmosphere and cooling.

The geometrical precision was evaluated by means of the undulation of the surface after machining.

The surface roughness refers to the surface after RIE.

The internal stress calculated from warp observed after the annealing for quality assurance was used as a measure of the warp during production of thin-film magnetic heads.

Application to thin-film heads: A sintered material according to the invention was used to fabricate a thin-film magnetic head, and it was observed that the material based on $Al_2O_3$—$TiC_xO_yN_z$ with crystallites of controlled size uniformly dispersed gave rise to a surface roughness lower than 2500Å (0.25 μm) on the ABS formed by RIE and a resistance to particle pull-out ($R_{max}$) of less than 200Å, thus achieving a low flying height suitable for MR heads.

Deformation of the substrate during the manufacture of MR heads proved to be very low due to the relaxation of internal stress by annealing.

In contrast, conventional substrate materials for magnetic heads obtained by HP or HIP sintering of known powders, as illustrated by specimens No.1–No.9 above, showed inferior surface roughness of the ABS formed by RIE, geometrical precision and deformation. This comparison demonstrates the superiority of the materials according to the invention.

The superiority of the materials according to the invention in the resistance to particle pull-out, lapping characteristics, deformation during fabrication of thin-film heads, roughness of the surface after machining such as IBE or RIE, and ease of high precision machining is due to the bonding of $Al_2O_3$ and $TiC_xO_yN_z$ being stronger than in conventional materials.

Conventional materials prepared from $Al_2O_3$, TiC and additives simply mixed in a ball mill, have not always achieved uniform distribution of the components, as evidenced by scanning electron micrographs (×5000) showing 9 μm² square areas in which TiC crystallites are absent, which resulted in rather rough surfaces at steps formed on the surface. In contrast, the materials according to the invention proved, as demonstrated above, to be an excellent material that can be applied to miniaturized thin-film heads in the future.

To help understand the materials according to the invention, examples of conversion of the composition are given in Table 8.

The molar, volume and weight percentages in the Table were calculated from results of analysis for the values X, Y and Z of $TiC_xO_yN_z$, and X-ray density obtained from the lattice constants given by X-ray diffraction.

The advantages of the present invention are summarized below:

(1) The strong bonding between crystallites provided by the $Al_2O_3$—$TiC_xO_yN_z$ matrix and the controlled crystallite size which is fine and uniform allow the material to meet all requirements of substrate materials for magnetic heads, and further provides low surface roughness after RIE or other types of machining, and the possibility of fabrication of defect-free MR heads.

(2) The small amount of Mg or other metals and rare earth elements added to the $Al_2O_3$—$TiC_xO_yN_z$ matrix results in uniform structure without segregation of these components and decreased surface roughness due to difference in etching rates in formation of steps.

(3) The relaxation of internal stress results in small deformation during fabrication of thin-film heads and magnetic annealing of MR heads.

(4) The composition, crystallite size, amount of additive elements, and internal stress of the material as described above allow high precision machining needed for controlled low flying height and contribute to improved throughput in head production.

We claim:

1. Substrate materials for magnetic heads consisting of 24–75 mol % of $\alpha$-$Al_2O_3$ and the remaining 76–25 mol % of a phase having an NaCl structure with an average composition $TiC_xO_yN_z$, where $0.5 \leq X \leq 0.995$, $0.005 \leq Y \leq 0.30$, $0 \leq Z \leq 0.20$, and $0.505 \leq X+Y+Z \leq 1$.

2. Substrate materials for magnetic heads consisting of 100 mol % of a base material of a composition of 24–75 mol % of $\alpha$-$Al_2O_3$ and the remaining 76–25 mol % of a phase having a NaCl structure with an average composition $TiC_xO_yN_z$, where $0.5 \leq X \leq 0.995$, $0.005 \leq Y \leq 0.30$, $0 \leq Z \leq 0.20$, and $0.505 \leq X+Y+Z \leq 1$, a compound containing 0.8 mol % or less of a metal selected from Mg, Ca, Zr and Cr, and a compound containing 0.4 mol % or less of a rare earth metal, the total concentration of said metal and rare earth elements being in a range of 0 to 0.8 mol %.

3. Substrate materials for magnetic heads according to claims 1 or 2, further comprising $TiO_n$ where $n \leq 2$.

4. Substrate materials for magnetic heads according to claim 2, wherein said compounds of Mg, Ca, Zr or Cr are oxides of these metals or spinels, solid solutions or compound oxides with $Al_2O_3$, and said rare earth compounds are oxides of rare earth elements, garnets with $Al_2O_3$, or intermetallic compounds of at least one of the rare earth elements and at least one of Al, Mg, Ca, Zr and Cr.

5. Substrate materials for magnetic heads according to claim 1, wherein said substrate materials have an average crystallite size of 0.3–1.5 μm, and a ratio of the crystallite size of $TiC_xO_yN_z$ to that of $Al_2O_3$ of 0.3–1.0.

6. Substrate materials for magnetic heads according to claim 1 wherein any 9 μm² square area on a surface of said substrate materials comprises either at least one crystallite of, or one aggregate particle containing, $TiC_xO_yN_z$, or a part of said crystallite or aggregate particle.

7. Substrate materials for magnetic heads according to claim 1, wherein said substrate materials have an internal stress σ of 1 MPa or less, said σ being calculated by $$\sigma = (B/A) \times (Et/r^2) \times \delta \quad (1)$$

where A and B are constants depending on the geometry of the material (A=0.67 and B=1.24), E is the Young's modulus of the material, t is the thickness of the substrate, r is the radius of a disk prepared from the material, σ is the internal stress and δ is the warp of said disk during annealing at a temperature of 70% or higher than the sintering temperature.

* * * * *